United States Patent [19]

Knothe et al.

[11] Patent Number: 4,542,800
[45] Date of Patent: Sep. 24, 1985

[54] SPRING BODY WITH INTEGRATED PARALLEL GUIDE FOR A BALANCE WITH AN UPPER SCALE

[75] Inventors: Erich Knothe, Bovenden; Matthias Eger; Eberhard Stadler, both of Göttingen; Herbert Engelhardt, Moringen-Behrensen, all of Fed. Rep. of Germany

[73] Assignee: Sartorius GmbH, Fed. Rep. of Germany

[21] Appl. No.: 557,208

[22] Filed: Dec. 2, 1983

[30] Foreign Application Priority Data

Dec. 3, 1982 [DE] Fed. Rep. of Germany ....... 3244756

[51] Int. Cl.⁴ .......................... G01G 3/08; G01G 3/14
[52] U.S. Cl. ..................................... 177/211; 177/229; 73/862.65
[58] Field of Search .............................. 177/211, 229; 73/862.65

[56] References Cited

U.S. PATENT DOCUMENTS 2,859,613 11/1958 Green ........................... 73/862.65 X
3,805,604 4/1974 Ormond ........................ 177/211 X
4,212,197 7/1980 Kawai et al. ................... 177/211 X

FOREIGN PATENT DOCUMENTS

WO83/00222 1/1983 PCT Int'l Appl. ............... 177/211

Primary Examiner—Thomas H. Tarcza
Assistant Examiner—Patrick W. Foster
Attorney, Agent, or Firm—Eric P. Schellin

[57] ABSTRACT

In a spring body which is manufactured from a cubical piece, intended for a balance with an upper scale, divided into an upper and a lower guide bar by a horizontal opening extending all the way through it so that the spring body also forms the parallel guide for the balance scale, and which has wire strain gauges at thin spots in the areas of at least one guide bar the width of the spring body is divided at least in the area of the guide bars into two partial areas by a vertical opening which extends all the way through it and does not contact the edge. The vertical opening can have various shapes. The wide spring body has the advantages of in sensitivity to errors caused by off center loading and allowing the scale to be connected to the parallel-guided part of the spring body at two or three points, which reduces the stability requirements of the scale. The strain gauge are advantageously distributed so that one half of them is on each of the two areas of spring body. The strain gauges can be applied in various configurations.

6 Claims, 6 Drawing Figures

SPRING BODY WITH INTEGRATED PARALLEL GUIDE FOR A BALANCE WITH AN UPPER SCALE

FIELD OF THE INVENTION

The invention is relative to a spring body for a balance having an upper scale.

BACKGROUND OF THE INVENTION

This spring body is manufactured from a cubical piece and is divided into an upper and a lower guide bar by a horizontal opening extending all the way through it, so that the spring body also forms the parallel guide for the balance scale and has wire strain gauges or the equivalent at thin spots in the area of at least one of the guide bars. Spring bodies of this type are generally known and are described, for example, in Swiss Pat. No. 353,555 by FIGS. 4 and 5 or in German Federal Republic DE Pat. No. 2,900,614 by FIGS. 1 and 2.

A disadvantage of these known structures is the fact that when there is an off-center load on the balance scale in a direction vertical to the longitudinal plane of the spring body, very great bending and torsional moments act on the guide bars. This limits the possible size of the scale and furthermore leads to large expansion gradients in the area of the strain gauges, thus making necessary a very exact positioning of the strain gauges.

SUMMARY OF THE INVENTION

The invention has the task of creating a spring body of the type mentioned above which does not have these disadvantages and can therefore in particular be provided with a large balance scale.

The invention achieves this as follows: The width of the spring body is greater than its height and it is divided into two partial areas by a vertical opening which does not contact the edge and extends all the way through. This allows the spring body to be made very wide without the elastic constant of the parallel guide becoming too great and without the expansion in the area of the thin spots becoming too small. On account of the great base width of the spring body the bending and torsional moments preferably result in traction and pressure forces in the partial areas of the guide bars when the scale has an off-center load which remain relatively low due to the reversed proportionality to the width.

The vertical opening can have various shapes, e.g. rectangular, H-shape, U-shape or a meandering shape. The opening is preferably made by a milling process. This can be accomplished in an especially economical manner if the opening has the same width overall.

The wide spring body has the further advantage that the scale can be connected to the parallel-guided part of the spring body at two or three points, which reduces the stability requirements of the scale.

The strain gauges are advantageously distributed equally on the two spring bodies. The strain gauges can be applied so that all are on the upper or on the lower guide bar, as desired, which results in a particularly simple placing; or, each of the four partial guide bars can have two strain gauges, which results in a particularly good symmetry.

These and further constructional and operational characteristics of the invention will be more evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 2:
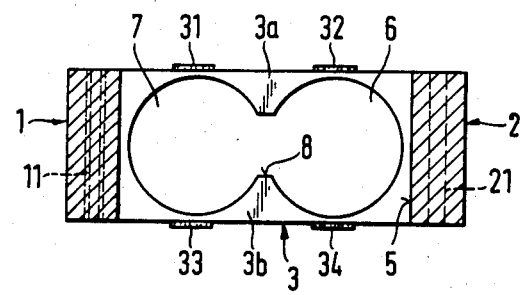
FIG. 2 shows the spring body in section along line II—II in FIG. 1.
Figure 1:
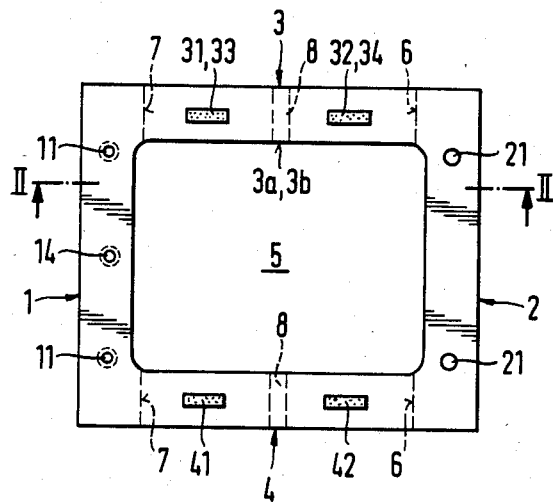
FIG. 1 shows the spring body in a top view.

Referring now to the drawing wherein reference numerals are used to designate parts numerals throughout the various figures thereof, there is shown in FIG. 1 in a top view the device as intended for a balance with an upper scale consisting of a spring body 2 held permanently to the housing, e.g. by screws (not shown) which extend through the two bore holes 21. The spring body consists further of two guide bar areas 3 and 4 which form the parallel guide for area 1, which carries the balance scale (not shown). The scale is fastened either to the two threaded holes 11 or only centrally to threaded hole 14. The two guide bar areas 3 and 4 have the same cross section, which is shown in FIG. 2. The two guide bars (upper guide bar 3a and lower guide bar 3b), which form the parallel guide together, are worked out by means of two continuous bore holes 6 and 7 and a slit-like milled-out area 8. Wire strain gauges or the equivalent 31, 32, 33 and 34 are applied at the four thin spots. Corresponding strain gauges are located on guide bar area 4. It would also suffice if the strain gauges were applied either only on the top of the spring body (strain gauges 31, 32, 41 and 42) or only on the bottom of the spring body. The strain gauges can also be applied to the cylindrical inside of the thin spots, as shown in FIG. 2. When the scale is loaded, the parallel-guided part 1 connected to the scale drops down in a known fashion and the strain gauges are stretched or compressed, which can be transformed in a fashion which is also known into an electric signal proportional to the load on scale.

The entire spring body is manufactured from one piece, preferably by first working out the vertical opening 5 (FIG. 1) by milling from a metal cube and then drilling holes 6 and 7 next to the two guide bar areas 3 and 4 and connecting them by slit 8. This preserves all the advantages of a single-piece manufacture such as, for example, the lack of jammed areas or of pressed-in spots. The die cast metal method could also be used for the manufacture.

The other embodiments of the spring body shown in FIGS. 3 to 6 differ by the different shapes of vertical opening 5 and, occasioned thereby, by the position of the fastening points for the scale on the spring body and for the fastening of the spring body to the housing. All embodiments have an area 2 fixed permanently to the housing, two guide bar areas 3 and 4, whose cross section corresponds to the cross section shown in FIG. 2, and a parallel-guided area 1 which carries the balance scale.

Figure 3:
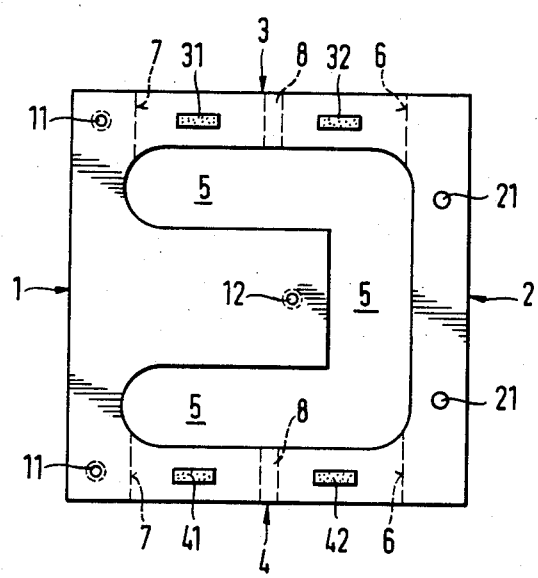
FIGS. 3 to 6 show different variants of the spring body in a top view.

Opening 5 is U-shaped in the embodiment of FIG. 3. The width of this opening is the same overall, so that the U has to be traveled only once in a manufacture by milling. The spring body is fastened to the housing by the two holes 21. In this embodiment the scale can be fastened only at threaded hole 12 or additionally at the two threaded holes 11, so that there is a three-point support and less demands on the stability of the scale.

Figure 4:
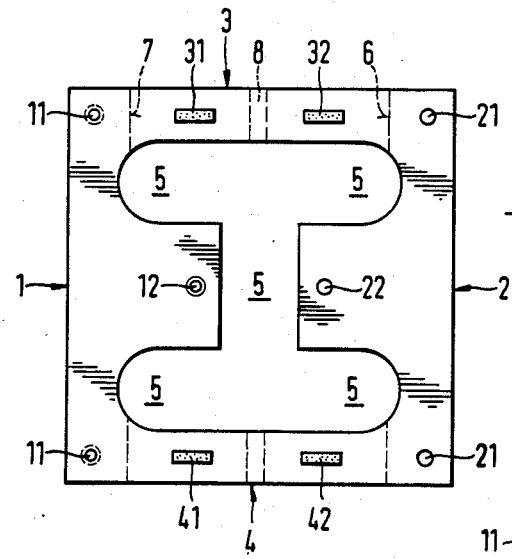

The opening 5 is H-shaped in the embodiment of FIG. 4. This imparts the same geometry to part 2 fixed to the housing and to parallel-guided part 1, which results in a very high symmetry of the distribution of force. The scale can be fastened to the spring body by threaded hole 12 and/or by the two threaded holes 11. The spring body is fastened to the housing in a corresponding manner by hole 22 and/or by the two holes 21. The width of opening 5 can again be the same overall for reasons of manufacture.

Figure 5:
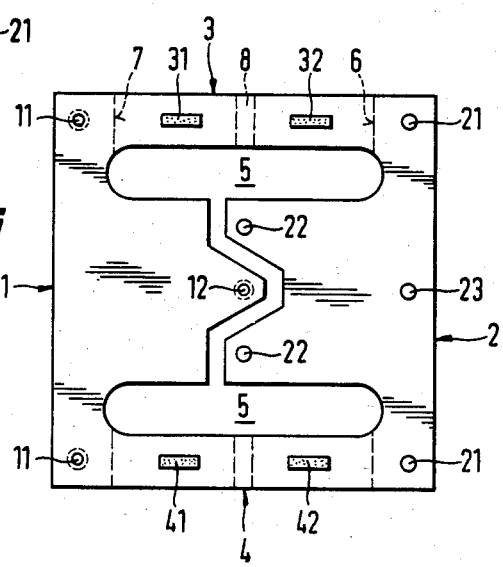

The embodiment of FIG. 5 is modified in relation to that of FIG. 4 in such a manner that when the scale is fastened to the spring body by threaded hole 12 and when the spring body is fastened to the housing by the two holes 22, no torque occurs at the fastening points under a central load.

In a differing fashion it is also possible in this embodiment for the scale to be fastened at three points (threaded holes 11 and 12) to the spring body, and the spring body can likewise be fastened to the housing at three points (holes 22 and 23) or at four points (holes 21 and 22).

Figure 6:
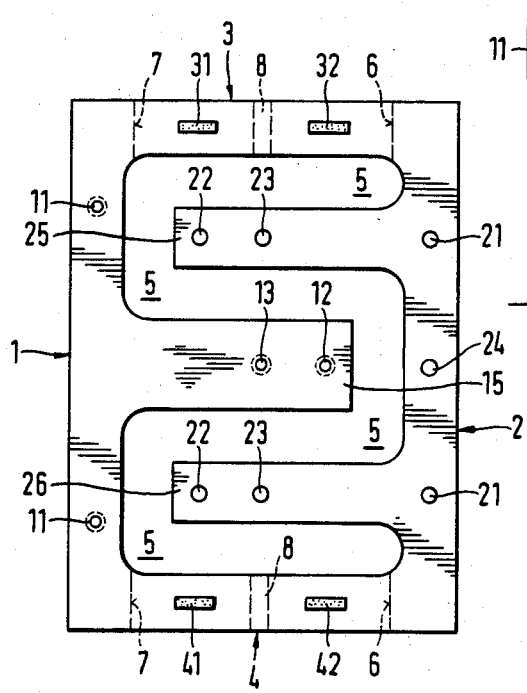

Opening 5 is meander-shaped in the embodiment of FIG. 6. Two fingers 25 and 26 remain part of part 2 fixed to the housing, and finger 15 remains part of parallel-guided part 1. The fastening of the scale to the spring body (by threaded hole 13) can again be located between the two fastening points 23 of the spring body to the housing, so that no torque occurs. It is also possible for the scale to be additionally fastened to the spring body by the two threaded holes 11, and the two holes 22 and/or the two holes 21 and/or hole 24 are additionally selectively available for fastening the spring body to the housing.

In FIG. 6 in opening 5 has the same width overall in order to achieve an economical manufacture by milling. It is also possible to make the openings narrower at the tips of fingers 15, 25 and 26 than in the other areas. This requires a more expensive manufacture by milling, but it has the advantage that even with a three-point fastening of the scale to the spring body by threaded holes 11 and 12 and with a three-point fastening of the spring body to the housing by holes 22 and 24 the centers of gravity of the two triangles of the fastening points almost coincide. The fastening points of the scale to the spring body and of the spring body to the housing can also be brought closer to each other by means of this measure.

This invention is not limited to the preferred embodiments and alternatives heretofore described, to which variations and improvements may be made, consisting of mechanically and electrically equivalent modifications to component parts and procedures without leaving the scope of the present patent, the characteristics of which are summarized in the following claims.

What is claimed is:

1. A spring body for a balance with an upper scale comprising:
    a single cubical piece having six rectangular outside faces;
    a first opening formed through the cubical piece from a first horizontal outside face to an opposite second horizontal outside face;
    a second opening formed through a third vertical outside face to the first opening, so as to form first and second parallel bars having at least one spot of thin vertical cross section on each of the parallel bars;
    a third opening formed through fourth outside vertical face which is opposite the third vertical outside face, which extends to the first opening, the third opening being coaxial and of identical shape and size as the second opening, and forms third and fourth parallel bars having at least one spot of thin vertical cross section on each of the bars; and
    three scale receiving bores located on the first horizontal surface for mounting a scale to the cubical piece; and
    the first opening is H-shaped.

2. A spring body as defined by claim 1 wherein the H-shaped first opening forms two protruding fingers and one of these protruding fingers is provided with one of the three scale receiving bores.

3. A spring body for a balance with an upper scale comprising:
    a single cubical piece having six rectangular outside faces;
    a first opening formed through the cubical piece from a first horizontal outside face to an opposite second horizontal outside face;
    a second opening formed through a third vertical outside face to the first opening, so as to form first and second parallel bars having at least one spot of thin vertical cross section on each of the bars;
    a third opening formed through a fourth outside vertical face which is opposite the third vertical outside face, which extends to the first opening, the third opening being coaxial and of identical shape and size as the second opening, and forms third and fourth parallel bars having at least one spot of thin vertical cross section on each of the bars; and
    three scale receiving bores located on the first horizontal surface for mounting a scale to the cubical piece; and
    the first opening is meander-shaped so as to form three finger-shaped pieces between the parallel bars.

4. A spring body as defined by claim 3 wherein one of the three finger shaped pieces is provided with one of the three scale receiving bores.

5. A spring body for a balance with an upper scale comprising:
    a single cubical piece having six rectangular outside faces;
    a first opening formed through the cubical piece from a first horizontal outside face to an opposite second horizontal outside face;
    a second opening formed through a third vertical outside face to the first opening, so as to form first and second parallel bars having at least one spot of thin vertical cross section on each of the bars;
    a third opening formed through a fourth outside vertical face which is opposite the third vertical outside face, which extends to the first opening, the third opening being coaxial and of identical shape and size as the second opening, and forms third and fourth parallel bars having at least one spot of thin vertical cross section on each of the bars;
    strain gauge means attached to the thin spots of the parallel bars; and
    three scale receiving bores located on the first horizontal surface for mounting a scale to the cubical piece; and
    the first opening is U-shaped.

6. A spring body as defined in claim 5 wherein the U-shaped first opening forms a single protruding finger which is provided with one of the three scale receiving bores.

* * * * *